(12) United States Patent
Sugawara

(10) Patent No.: US 6,572,042 B2
(45) Date of Patent: Jun. 3, 2003

(54) SPINNING-REEL LINE GUIDING APPARATUS

(75) Inventor: Ken'ichi Sugawara, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 10/058,779

(22) Filed: Jan. 30, 2002

(65) Prior Publication Data

US 2002/0100828 A1 Aug. 1, 2002

(30) Foreign Application Priority Data

Feb. 1, 2001 (JP) .................................... 2001-025453

(51) Int. Cl.[7] .............................................. A01K 89/01
(52) U.S. Cl. .................................. 242/231; 242/157 R
(58) Field of Search ................................ 242/230, 231, 242/232, 157 R

(56) References Cited

U.S. PATENT DOCUMENTS

| | | | | |
|---|---|---|---|---|
| 3,670,984 A | * | 6/1972 | Lemery ................... | 242/231 |
| 3,834,644 A | * | 9/1974 | Stackawicz ............. | 242/231 |
| 6,220,537 B1 | * | 4/2001 | Amano et al. .......... | 242/231 |
| 6,371,395 B2 | * | 4/2002 | Sato ........................ | 242/232 |
| 6,405,955 B2 | * | 6/2002 | Furomoto ................ | 242/231 |

FOREIGN PATENT DOCUMENTS

| | | |
|---|---|---|
| JP | 10-117644 A | 5/1998 |
| JP | 2001-17039 A | 1/2001 |
| JP | 2001-61382 A | 3/2001 |

* cited by examiner

Primary Examiner—Emmanuel Marcelo
(74) Attorney, Agent, or Firm—Shinjyu Global IP Counselors, LLP.

(57) ABSTRACT

A spinning-reel line-guiding apparatus that prevents fishing line snarl on a bail arm is provided. A spinning reel bail arm 7 has first and second bail-support members, a stationary shaft 10, a stationary-shaft cover 11, a line roller 12, and a bail 13. The stationary shaft cover 11 is provided on a projecting end of the stationary shaft 10 and spaced from the first bail-support member. An apex 11a of the stationary-shaft cover 11 is situated in a spinning-reel rear direction and outward in a diametrical direction of a spool. The bail 13 is plug-fastened into the second bail-support member and the apex 11a of the stationary shaft cover 11. The bail 13 is joined smoothly with a first ridgeline 11b on the fishing-line guiding side of the stationary shaft cover 11, and a second ridgeline 11c that opposes the first ridgeline 11b in flanking the apex 11a.

20 Claims, 6 Drawing Sheets

SPINNING-REEL LINE GUIDING APPARATUS

BACKGROUND OF THE INVENTION

1. Field of the Invention

The present invention relates to fishing-line guiding apparatuses. More specifically, the present invention relates to fishing-line guiding apparatuses fitted pivotally to fore-ends of first and second rotor arms of a spinning-reel for guiding fishing line onto a spool.

2. Background Information

Spinning-reel rotors are usually equipped with a bail arm for guiding fishing line onto the spool. The bail arm is one example of a fishing-line guiding apparatus. The bail arm is mounted on fore-ends of first and second arms of a rotor, and pivots between a line-releasing posture and a line-retrieving posture. The bail arm has first and second bail-support members, a stationary shaft, a stationary shaft cover, a line roller, and a bail. The bail is mounted on the fore-ends of the first and second rotor arms. Each arm is configured to pivot. The stationary shaft is a rod, one end of which is fixed to the first bail-support member. The stationary shaft cover is a cap provided on the other end of the stationary shaft and spaced at a interval from the first bail-support member. The line roller is made of metal and is rotatably attached to the stationary shaft. The outer periphery of the roller guides the fishing line. The bail is made of metal wire, and is provided to extend between the second bail-support member and the stationary shaft cover.

To design lightweight rotors, first and second bail-support members of the bail arms made with synthetic resin such as nylon 66 strengthened with, e.g., fiberglass are known.

The bail arm is flipped into the line-releasing posture to reel fishing line out from the spool. When the bail arm is restored into the line-retrieving posture, the fishing line passes over the stationary shaft cover and is guided by the line roller. The fishing line contacts and rubs on the bail. Further, the fishing line is guided onto the spool.

Japanese Laid-Open Pat. App. Pub. No. 10-117644 discloses a bail arm that has a stationary shaft cover with a rounded conical shape in order to guide fishing line smoothly onto the line roller. The bail and stationary shaft cover of this bail arm are configured such that the distance between where the fishing-line on the guide side contacts the part of the bail and the stationary shaft cover on the line-roller side, and where the fishing-line contacts the spool becomes accordingly shorter in a direction from the bail to the line roller. To realize this, the stationary shaft cover is made into a triangular conic shape whose apex is off-centered so as to point in a reel rear direction and outward in a diametrical direction of the spool. Further, in order to conceal the apex of the stationary shaft cover, the bail is inserted in the vicinity of the apex into a ridgeline on the fishing-line guide side, and is joined smoothly with the ridgeline.

When the foregoing conventional bail arm guides fishing line from the bail to the line roller, the bail arm usually guides the fishing line smoothly and line snarl is unlikely to occur. Nevertheless, due to such factors as line-slack, the fishing line can wrap over the side of the bail opposite the side that the fishing line contacts when guided. When the fishing line shifts from the bail to the stationary shaft cover, it is liable to snag on the projecting apical part of the stationary shaft cover.

In view of the above, there exists a need for a spinning-wheel line guiding apparatus that overcomes the above-mentioned problems in the prior art. This invention addresses this need in the prior art as well as other needs, which will become apparent to those skilled in the art from this disclosure.

SUMMARY OF THE INVENTION

An object of the present invention is to prevent fishing line snarl on the bail arm, even if the fishing line slackens and wraps over the side opposite the line-guiding side.

A spinning-reel fishing-line guiding apparatus in accordance with a first aspect of the present invention is mounted on fore-ends of first and second rotor arms. The apparatus pivots between a line-releasing posture and a line-retrieving posture, and guides fishing line onto the spinning-reel spool. The apparatus has first and second bail-support members, a stationary shaft, a stationary shaft cover, and a bail. The first and second bail-support members are mounted pivotally on respective fore-ends of the first and second rotor arms. The stationary shaft is a rod that projects from the first bail-support member. The stationary shaft cover is provided on the projecting end of the stationary shaft. The stationary shaft cover is spaced from the first bail-support member. Using the axial center of the stationary shaft a reference, the stationary shaft cover has an approximately round cone shape whose apex is situated rearward of the spinning reel and diametrically outward of the spool when the bail arm is in a line retrieving posture. The line roller is rotatably attached to the stationary shaft. The bail is inserted and fastened at either end into the second bail-support member and the apex of the stationary shaft cover. The bail is joined smoothly with a first ridgeline on the fishing-line guiding side of the stationary shaft cover and a second ridgeline opposing the first ridgeline in flanking the apex.

The fishing-line guiding apparatus is pivoted into the line-releasing posture to facilitate casting. It is flipped over from the line-releasing posture into the line-guiding posture when the terminal tackle lands on the water surface after casting. Then, when the rotor is rotated, fishing line on the fishing-line guiding end is guided from the bail over the stationary shaft cover onto the line roller. Changing direction on the line roller, the fishing line, is then wound onto an outer periphery of the spool. Further, when the fishing-line guiding apparatus is flipped into the line-retrieving posture, slack in the fishing line can arise due to the impact of winds, etc. causing the fishing line to wrap over the side of the bail opposite the fishing-line guiding side.

Since the wire-fabricated bail is fixed in the apex of the roughly round-conical stationary shaft cover and the bail is joined smoothly into the first ridgeline on the fishing-line guiding side, snagging areas on the fishing-line guiding side are eliminated. Thus, when the fishing line is guided on the fishing-line guiding side from the bail to the stationary shaft cover, the fishing line is not liable to snag in the border area between the bail and the stationary shaft cover. Further, if the fishing line were to wrap over the side of the bail opposite the fishing-line guiding side, the bail is fitted into the apex of the stationary shaft cover and is joined smoothly to the second ridgeline on the side opposite the fishing-line guiding side. Thus, snagging areas on the side opposite the fishing-line guiding side are eliminated, and the fishing line is not liable to snag in the border area. Therefore, even if slackened fishing line wraps over onto the side opposite the fishing-line guiding side, it is not apt to snarl on the bail arm. Moreover, since the bail is made of wire, it may be made at a finer diameter compared to bails made of pipe. Even fine wet fishing line is not liable get stuck on the bail, nor is the fishing line apt to become snarled by the bail arm.

A spinning-reel fishing-line guiding apparatus in accordance with a second aspect of the present invention is the apparatus of the first aspect further having a mounting hole. The mounting hole is formed in the apex of the stationary shaft cover. A rim of the mounting hole is formed on a peripheral surface of the first ridgeline on the stationary shaft cover. The rim of the mounting hole is skewed to constitute an arcuate portion of an ellipse. When the fishing line shifts from the bail to the stationary shaft cover and contacts both the bail and the stationary shaft cover in the skewed rim area, the fishing line rides over onto the first ridgeline on the stationary shaft cover because the rim of the mounting hole is elliptical and formed at a slant. Therefore, the fishing line rides smoothly over from the bail to the stationary shaft cover and is guided smoothly onto the stationary shaft cover.

A spinning-reel fishing-line guiding apparatus in accordance with a third aspect of the present invention is the apparatus of the second aspect, wherein the ellipse is inclined at a predetermined angle with respect to a plane intersecting the center axis of the bail mounted in the stationary shaft cover. In this case, the fishing line is guided smoothly in the elliptical inclined area.

A spinning-reel fishing-line guiding apparatus in accordance with a fourth aspect of the present invention is the apparatus of the third aspect, wherein the ellipse in length along its major axis, which is toward the first-ridgeline, is two times or less the bail in diameter. In this case, even if fishing line that has gotten snagged on the side opposite the fishing-line guiding side exerts a strong force on the bail toward its fishing-line guiding side, the bail is prevented from bending toward the fishing-line guiding side.

A spinning-reel fishing-line guiding apparatus in accordance with a fifth aspect of the present invention is the apparatus of any of the previously mentioned aspects, wherein the stationary shaft and the stationary shaft cover are integrally formed and made of metal. Since, the number of parts, assembling steps, and processing steps may be curtailed, manufacturing costs can be reduced.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
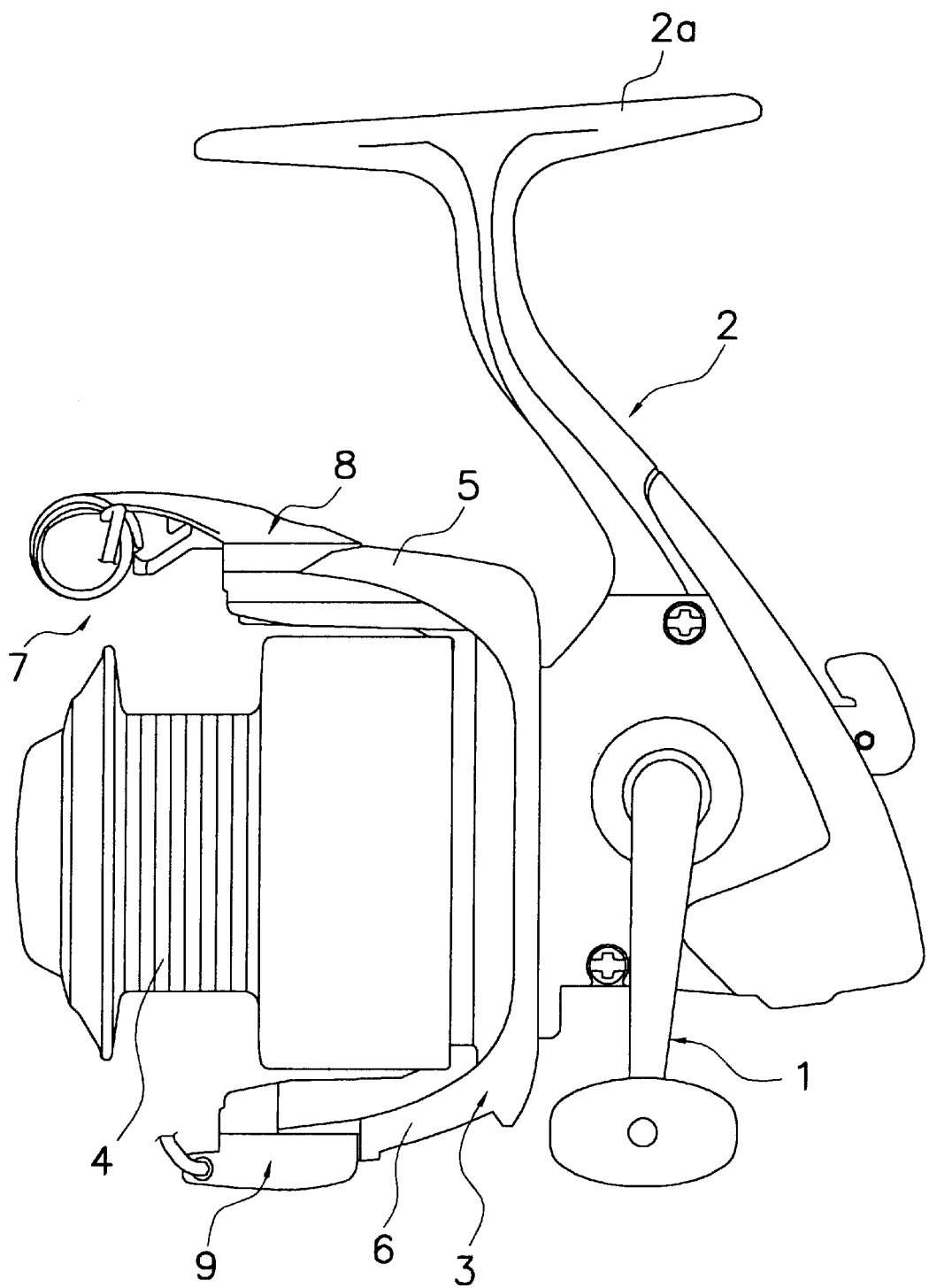
FIG. 1 is an elevational view of a spinning reel in accordance with a preferred embodiment of the present invention.

As shown in FIG. 1, a spinning reel in accordance with a preferred embodiment of the present invention has a reel body 2, a rotor 3, and a spool 4. The reel body 2 has a handle 1. The rotor 3 is rotatably attached to a front portion of the reel body 2. The spool 4 is located on the front of the rotor 3. Fishing line winds onto the spool 4.

A rod-mounting part 2a for attaching the spinning reel to a fishing rod is formed on the top of the reel body 2. A rotor-drive mechanism for rotating the rotor 3 and a level-wind mechanism for pumping the spool 4 back and forth along its rotational center axis to wind fishing line uniformly onto the spool 4 are provided in the interior of the reel body 2.

The rotor 3 has a first rotor arm 5 and a second rotor arm 6 extending frontward along the rotational axis. The two rotor arms 5, 6 are disposed opposing each other. A bail arm 7 (fishing-line guiding apparatus) is pivotally mounted on fore-ends of the two rotor arms 5, 6. The bail arm 7 swings between a line-releasing posture and a line-retrieving posture. The bail arm 7 returns from the line-releasing posture to the line-retrieving posture by means of a bail-flipping mechanism (not illustrated) linked to rotation of the handle 1 in the line-retrieving direction.

Figure 2:
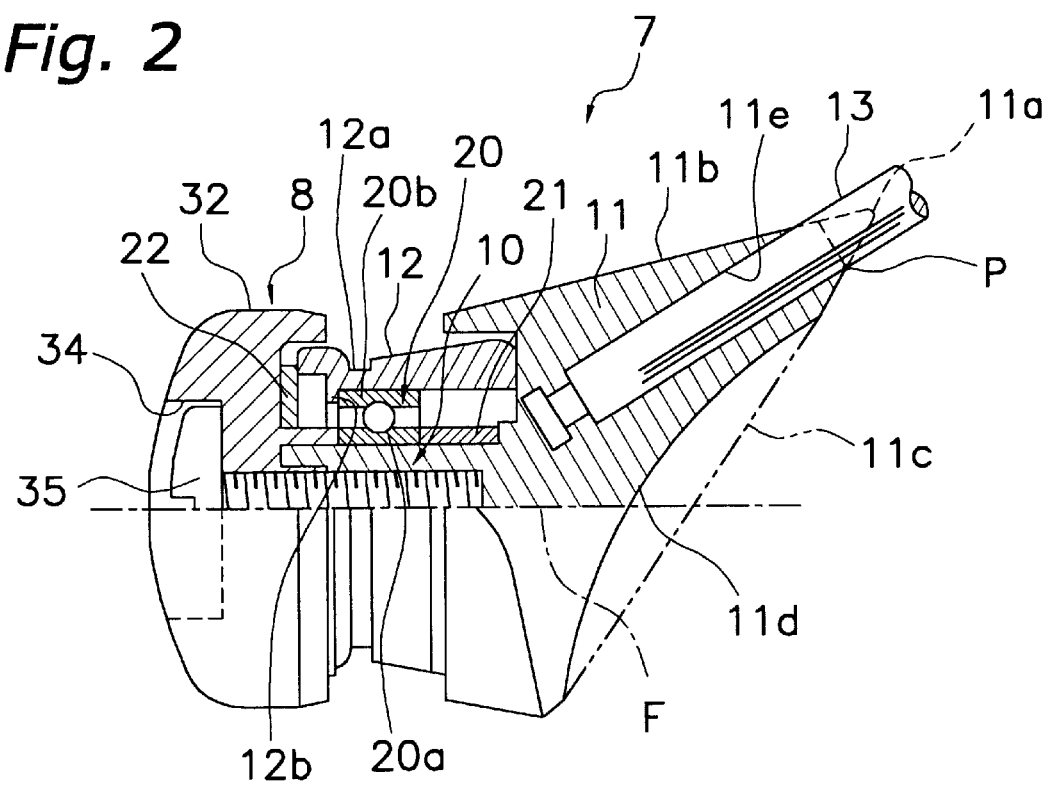
FIG. 2 is an elevational and partial cross-sectional view of a bail arm of the reel of FIG. 1 showing detail of a distal end.
Figure 3:
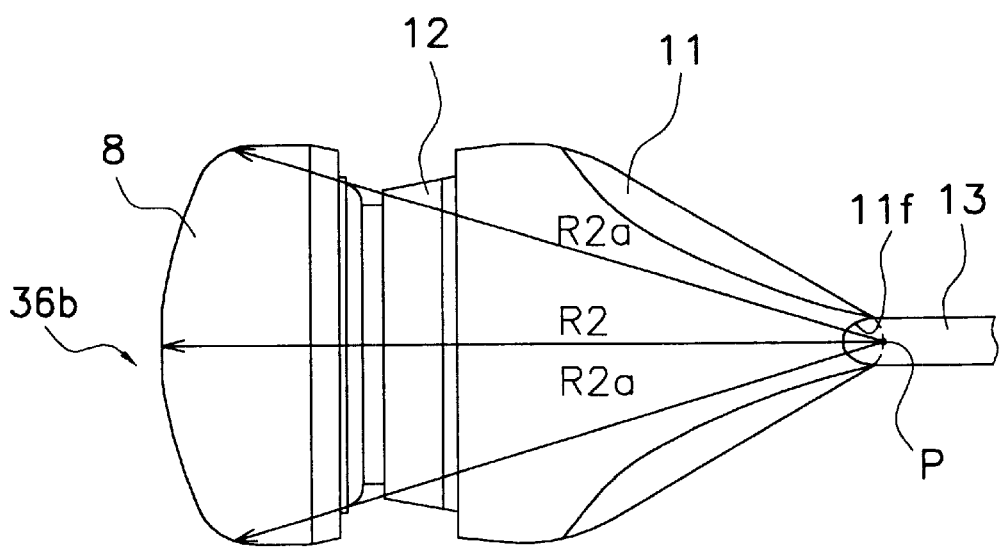
FIG. 3 is a plan view of the distal end of the bail arm of FIG. 2.

The bail arm 7 has a first bail-support member 8 and a second bail-support member 9. The first bail-support member 8 is mounted pivotally on the fore end of the first rotor arm 5. The second bail-support member 9 is mounted pivotally on the fore end of the second rotor arm 9. As seen in FIGS. 2 and 3, the bail arm 7 has a stationary shaft 10, a stationary shaft cover 11, a line roller 12, and a bail 13. One end of this stationary shaft 10 is affixed to a fore end of the first bail-support member 8. The stationary shaft cover 11 is provided on the other end of the stationary shaft 10 and spaced from the first bail-support member 8. The line roller 12 is rotatably attached to the stationary shaft 10. Referring to FIGS. 1 and 2, the bail 13 extends between the second bail-support member 9 and the stationary shaft cover 11. The first bail-support member 8 is mounted pivotally on the outer side of the fore end of the first rotor arm 5. The second bail-support member 9 is mounted pivotally on the outer side of the fore end of the second rotor arm 6. The first bail-support member 8 and the second bail-support member 9 are preferably manufactured of a high strength synthetic resin.

Figure 4:
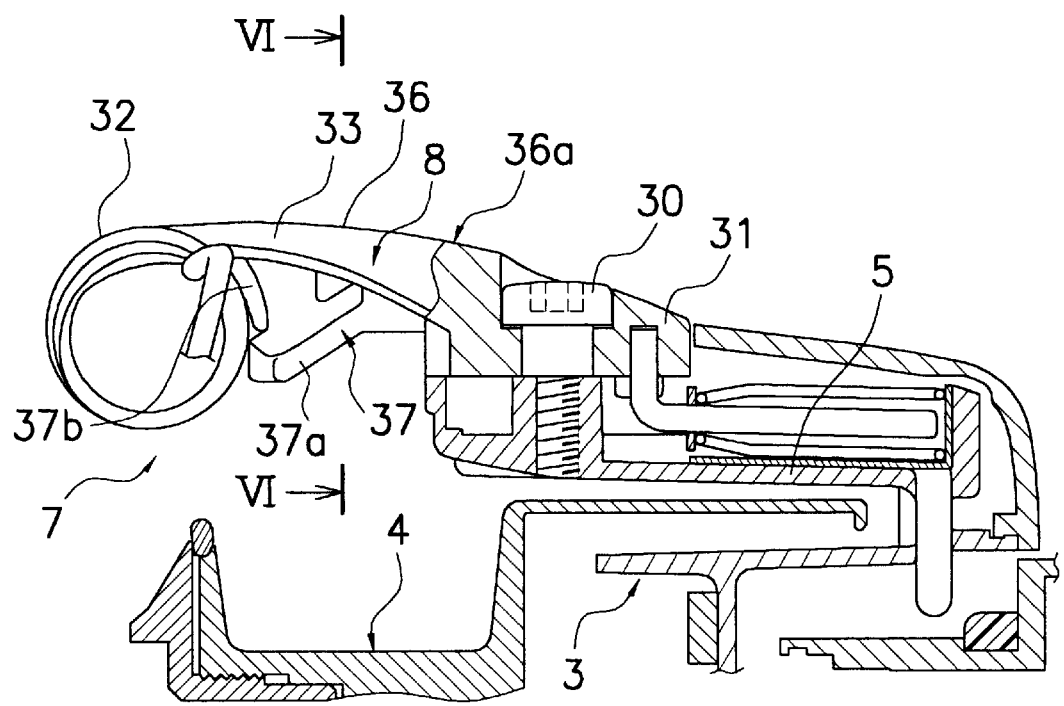
FIG. 4 is an elevational and partial cross-sectional view of a first bail-support member end of the reel of FIG. 1.
Figure 5:
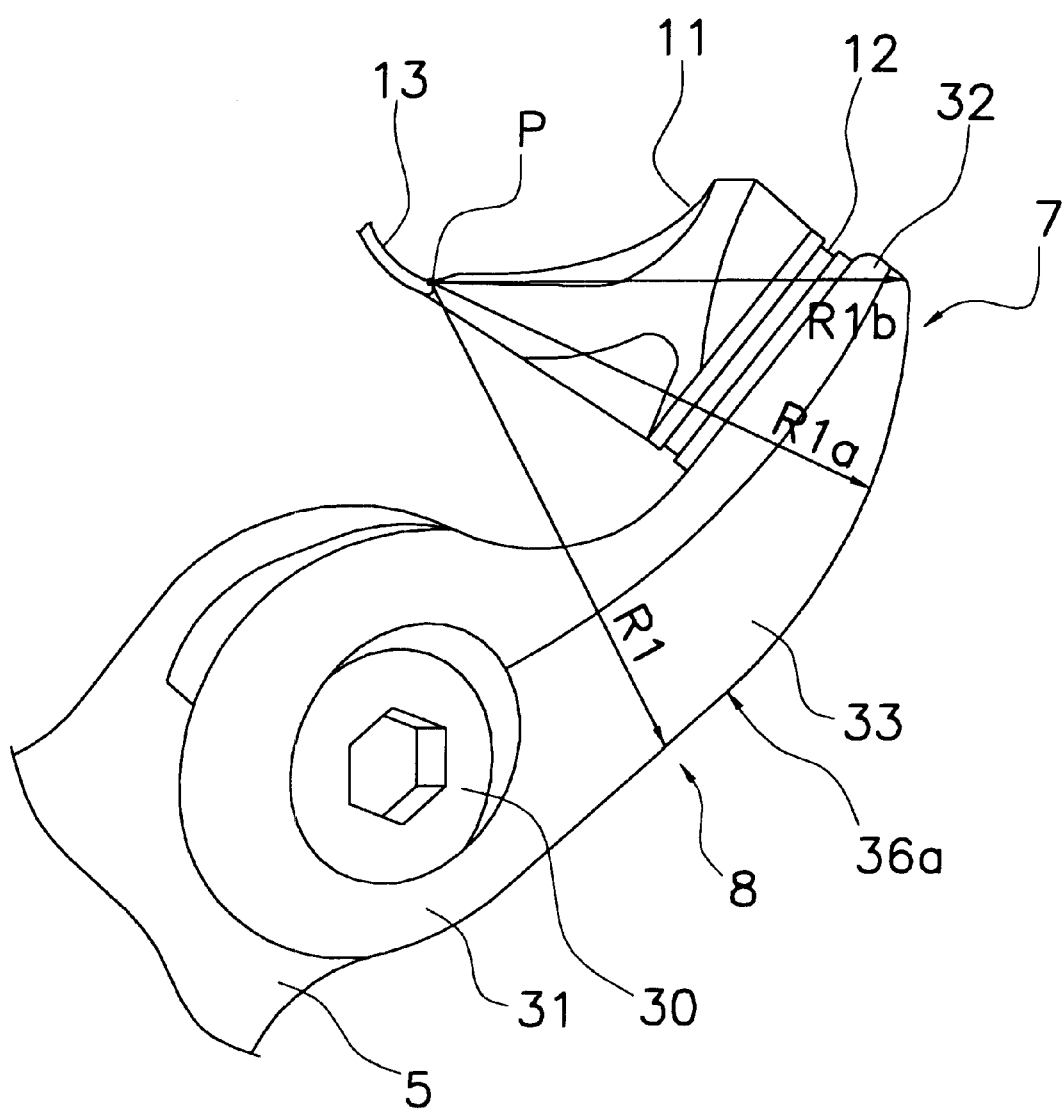
FIG. 5 is perspective view of the first bail-support member end.

As shown in FIGS. 4 and 5, the first bail-support member 8 has a round attaching portion 31, a round roller support portion 32, and a connecting portion 33. The round attaching portion 31 is pivotally attached to the first rotor arm 5 by a fastening bolt 30. As shown in FIG. 2, the round roller support portion 32 is affixed to the stationary shaft 10. The round roller support portion 32 is fitted to the line roller 12. The connecting portion 33 is molded to be of an approximately uniform thickness, and connects the attaching portion 31 and the roller support portion 32. As shown in FIG. 5, the roller support portion 32 is disposed at a position where the attaching portion 31 is twisted. As seen in FIG. 2, a stepped through-hole 34 is formed in the roller support portion 32. A fixing screw 35 for affixing the stationary shaft 10 to the first bail-support member 8 penetrates the through-hole 34.

As shown in FIG. 5, longitudinally oriented ridgeline 36a in the outer periphery 36 of the first bail-support member 8 lies on a sphere whose radius is a first distance R1. The first distance R1 is the maximum distance from a reference point P. The reference point P is the junction (point where a step-off occurs) between the stationary shaft cover 11 and the bail 13 to the ridgeline 36a. The first bail-support member 8 is formed such that distances R1a, R1b from the reference point P to the ridgeline 36a are shorter than the first distance R1. In general, the distance from the reference point P to ridgeline 36a becomes gradually shorter when heading outward from the first distance R1. Thus, the distance R1b is shorter than the distance R1a. Referring to FIG. 3, a second distance R2 is a radius that lies on sphere which is partially congruent with a ridgeline 36b on an outer periphery 36 of the first bail-support member 8 when oriented in a longitudinal direction. The second distance R2 is the maximum distance from the reference point P to the ridgeline (outer periphery in a cross-section viewed from above) 36b. The first bail-support member 8 is formed such that distances R2a from the reference point P to the ridgeline 36b are shorter than the second distance R2. In general, the distance from the reference point P to the ridgeline 36b becomes gradually shorter when heading outward from the second distance R2. Here, the second distance R2 is preferably the same length as the first distance R1.

By establishing the contour of the outer periphery 36 to be within such bounds if line snarl were to occur at the reference point P and the fishing line were to snag on the outer periphery of the first bail-support member 8, the line-retrieving operation would shift the snag position on the outer periphery of the first bail-support member 8 outward where the reference point P is center. Thus, the line would come right off, simultaneously the line snarl at the reference point P would be disentangled. Accordingly, line snarls are readily unsnarled.

Figure 6:
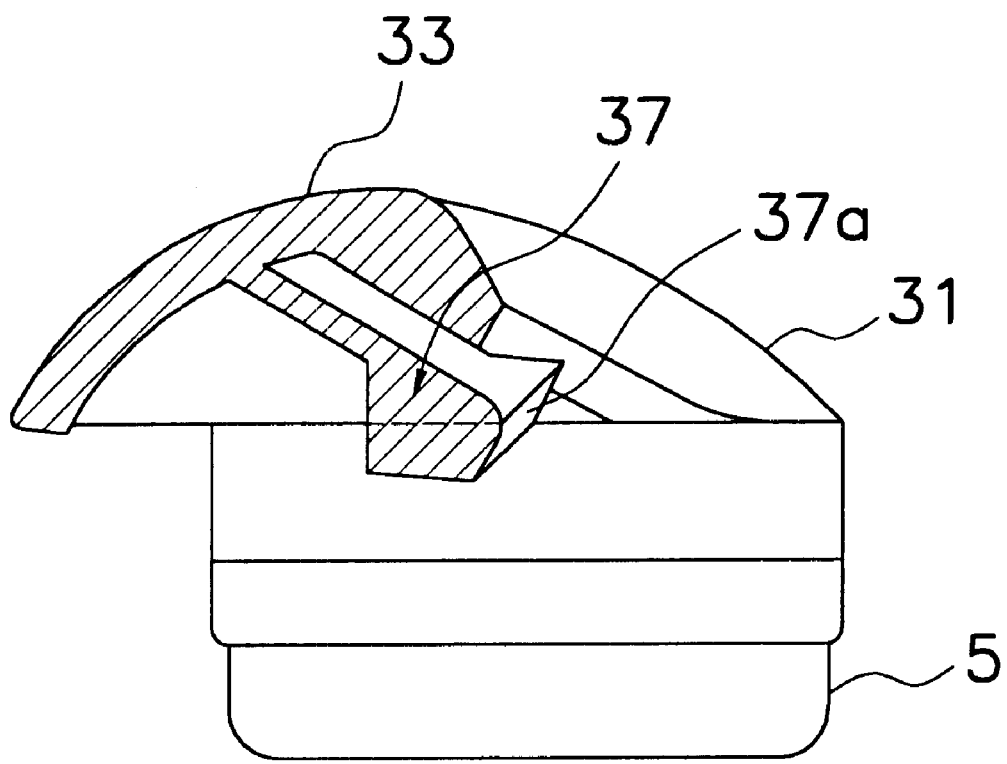
FIG. 6 is a view of the first bail-support member end of FIG. 4 taken along line VI—VI.

As shown in FIGS. 2 and 6, a line-slack suppressing part 37 has a fishing-line piloting surface 37a and a line-sleek preventing surface 37b. The fishing-line piloting surface 37a pilots fishing line toward the line roller 12. The line-slack preventing surface 37b is formed in the connecting portion 33. The line-slack preventing surface 37b is situated to project inward beyond the rest of the connecting portion 33 that is formed integrally with the first bail-support member 8 at approximately uniform thickness. The line-slack suppressing part 37 is a rib formed on the connecting portion 33 that juts in the direction that the stationary shaft 10 projects. The fishing-line piloting surface 37a is formed on the fore end of the line-slack suppressing part 37. The fishing-line piloting surface 37a slopes toward the outer circumferential surface of line roller 12. The line-slack preventing surface 37b is situated opposite to the line roller 12. If slack in the fishing line were to occur and the line were to break contact with the line roller 12, the line-slack suppressing part 37 would guide the fishing line toward the line roller 12, preventing the line slack mishaps.

Figure 7:
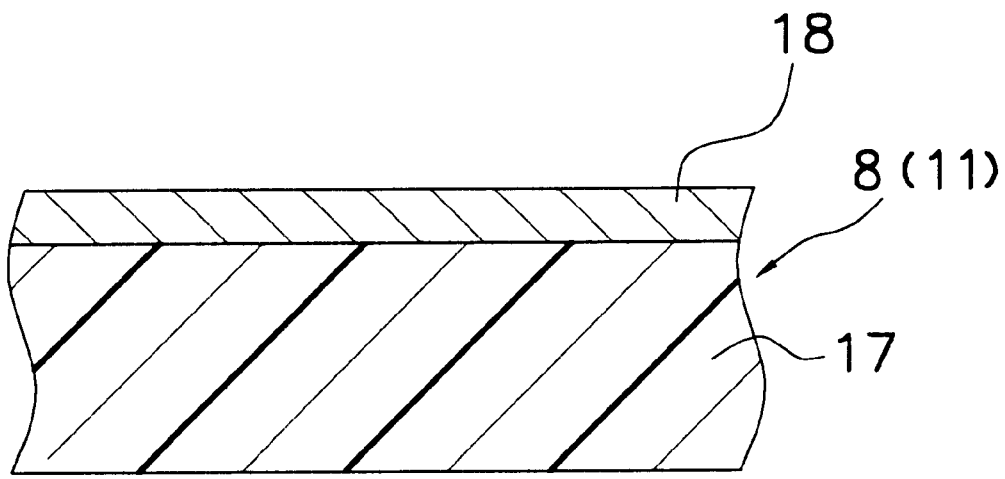
FIG. 7 is a schematic sectional view of the first bail-support member.

As shown in FIG. 7, the first bail-support member 8 is made mostly of a body section 17. The body section 17 is preferably made of a synthetic resin. The first bail-support member 8 is also made of a plating layer 18. The plating layer 18 is preferably a hard coating-film formed on the outer periphery of the body section 17. The body section 17 is a component made of synthetic resin in which preferably 50% each of ABS resin and PC resin are mixed. The mixing proportions of the ABS resin and the PC resin may be in a range from 40:60 to 60:40. The aforementioned range will sustain the strength of the first bail-support member 8 manufactured from the obtained synthetic resin, and ease the formation of the plating layer 18 superficially thereon. The plating layer 18 is for example a palladium (Pd) plating layer formed by a chemical plating method that is a non-electrolytic plating technique. This sort of palladium plating layer should cost less than a chrome plating layer. Moreover, since the plating layer 18 material ensures a smooth surface, the fishing line slides better. Further, due to the greater hardness of the material relative to synthetic resins, the plating layer 18 is not likely to scratch. Likewise, the metallic luster it yields provides a classic feel, and heightens durability.

Herein, the plating layer 18 is for example a palladium (Pd) plating layer formed according to an electroless plating process. In this case, a hard coating-film may be formed at less cost than chrome or similar plating through electrolytic plating means, and at the same time, the surface is made more even and smooth allowing the fishing line to slide easily. Therefore, even if the fishing line were to slacken and scrape on the outer periphery 36, the outer periphery is not liable to become scratched.

As shown in FIG. 2, the stationary shaft 10 is preferably made of a metal such as a stainless alloy. The basal end of the stationary shaft extends from the stationary shaft cover 11. The tip end of the stationary shaft 10 is fixed by means of a fastening screw 35 to the roller support portion 32 formed on the first bail-support member 8. The roller support portion 32 projects in a saucer shape from fore end of the first bail-support member 8. The roller support portion 32 is formed integrally with the fore end of the first bail-support member 8. The stationary shaft 10 is set into the roller support portion 32 to position it in the rotational direction so that the apex of the stationary shaft cover 11 is directed in a predetermined orientation.

The stationary shaft cover 11, is preferably made of a metal such as a stainless alloy, and is formed integrally with the stationary shaft 10 by a machining process. The stationary shaft cover 11 is provided on the projecting end of the stationary shaft 10. The stationary shaft cover 11 is spaced at an interval from the first bail-support member 8. With the axial center F of the stationary shaft 10 as a reference and the bail arm 7 in a line-retrieving posture, the stationary shaft cover 11 is roughly a round cone in contour whose apex 11a is situated to deviate in the spinning-reel rear direction and outward in the diametrical direction of the spool. A mounting hole 11e is provided for mounting the bail 13. The mounting hole 11e is formed in the apex 11a of the stationary shaft cover 11. The apex 11a is on the peripheral surface of a first ridgeline 11b of which the rim 11f of the mounting hole 11e is formed. The rim 11f is skewed to constitute a portion of an ellipse as seen in FIGS. 2 and 3. A hollowed void 11d is formed in a second ridgeline 11c on the side opposite the first ridgeline 11b on the fishing-line guiding side. The hollowed void 11d opposes the fishing-line guiding side in flanking the apex 11a. The elliptical rim 11f length along its major axis toward the first ridgeline 11b is two times or less the diameter of the bail 13. The rim 11f of the mounting hole 11e is an ellipse whose major axis length is comparatively short. Thus, even if fishing line that has gotten snagged on the side opposite the fishing-line guiding side were to exert a strong force on the bail 13 toward its fishing-line guiding side, the bail 13 is not liable to bend toward the fishing-line guiding side.

The line roller 12 is an approximately tubular component preferably made of a metal such as a stainless alloy. The line roller 12 is rotatably attached to the stationary shaft 10 via a bearing 20. The bearing 20 is fitted over the stationary shaft 10, between the roller support portion 32 and the stationary shaft cover 11. One end of an inner race 20a of the bearing 20 abuts the roller support portion 32. Another end of the inner race 20a end abuts a spacer 21 disposed between the inner race 20*a* and the stationary shaft cover 11. The inner race 20*a* is thereby located in the axial direction.

A circumferential groove 12*a* that is a guide portion for guiding fishing line onto the spool 4 is formed in the outer peripheral surface of the line roller 12. The line roller 12 is immovably engaged in the stationary shaft cover 11 direction with an outer race 20*b* of the bearing 20. On its inner circumferential surface, the line roller 12 has an interlock portion 12*b* that juts inward to lock an end face of an outer race 20*b* of the bearing 20 on the roller support portion 32 side. This immobilizes the line roller 12 in the stationary shaft cover 11 direction, and ensures a slight gap between the line roller 12 and the stationary shaft cover 11.

A thrust-receiving ring 22 is preferably made of a synthetic resin such as polyacetyl. The thrust-receiving ring 22 is disposed between an end face of the line roller 12 on the roller support portion 32 side, and the roller support portion 32. The thrust-receiving ring 22 prevents the line roller 12 from making direct contact with the roller support portion 32.

The bail 13 is preferably made of a wire made of a shape-memory alloy having super-elastic properties, such as Ni—Ti. Either end of the bail 13 is, for example, crimp-fastened to the second bail-support member 9 and the stationary shaft cover 11. The bail 13 is disposed to curve convexly outward from the spool 4. The bail 13 leads the fishing line onto the stationary shaft cover 11. One end of the bail 13 is inserted and fixed in the mounting hole 11*e* in the stationary shaft cover 11. The end of the bail 13 is joined smoothly with the first ridgeline 11*b* and the second ridgeline 11*c* on the stationary shaft cover 11.

Referring to FIG. 1, when casting, the bail arm 7 is flipped into the line-releasing posture, and the fishing rod is flung out forward. Then the lure or like terminal tackle under its own weight reels out fishing line from the spool 4. In this situation, sometimes the fishing line scrapes the first bail-support member 8 when the line slackens due to the impact of winds, etc. and the bail arm 7 is returned to the line-retrieving position. Even in such instances, since the plating layer 18 is made of a hard coating-film formed on the outer periphery 36 of the first bail-support member 8, the first bail-support member 8 is not liable to scratch. Further, the outer periphery 36 of the first bail-support member 8 is formed so that it gradually becomes smaller in diameter. Thus, even if a snarl were to occure due to slack in the fishing line between the outer periphery 36 and the reference point P, the line is not liable to snag on the first bail-support member 8.

Referring to FIGS. 1 and 2, when the rotor 3 is rotated by the handle 1 after casting, a bail-returning mechanism returns the bail arm 7 into the line-retrieving posture. By the rotation of the rotor 3, the fishing line, passing from the bail 13 over the stationary shaft cover 11, is then guided onto the line roller 12 and wound onto the spool 4. The fishing line is then guided onto the spool 4 running along the circumferential groove 12*b* in the line roller 12. The wire-fabricated bail 13 is inserted and fixed into the apex 11*a* of the roughly round-conical stationary shaft cover 11, and the bail 13 is joined smoothly to the first ridgeline 11*b* on the fishing-line guiding side to eliminate snagging areas on the fishing-line guiding side. Thus, when the fishing line is guided on the fishing-line guiding side from the bail 13 to the stationary shaft cover 11, the fishing line is not liable to snag in the border area between the bail and the stationary shaft cover. Further, even if owing to line slack the fishing line were to wrap over the side of the bail opposite the fishing-line guiding side, the bail 13 is fitted into the apex 11*a* of the stationary shaft cover 11, and is joined smoothly to the second ridgeline 11*c* on the side opposite the fishing-line guiding side. Therefore, snagging areas on the side opposite the fishing-line guiding side are eliminated and the fishing line is not liable to snag in the border area. Even if fishing line gone slack wraps over onto the side opposite the fishing-line guiding side, it is not apt to snarl on the bail arm 7. Moreover, since the bail is made of wire, it may be made at a finer diameter compared to bails made of pipe. Thus, even fine wet fishing line is not liable get stuck on the bail 13, nor is the fishing line apt to become snarled by the bail arm 7.

Here, the bearing 20 allows the line roller 12 to rotate lightly as fishing line passes over the line roller 12. Thereby letting the fishing line pass smoothly without being subject to a large resistive force.

Furthermore, if the fishing line were to come off the line roller 12 and slacken, the line-slack suppressing part 37 projecting toward the spool 4 is formed on the first bail-support member 8 to return the fishing line to the line roller 12.

Other Embodiments (a) In the foregoing embodiment, the stationary shaft cover and the stationary shaft are formed integrally, but they may be formed separately.

(b) In the foregoing embodiment, the first bail-support member 8 is disposed outward of the first rotor arm 5, but the first bail-support member 8 may be arranged inward of the first rotor arm 5.

(c) In the foregoing embodiment, the bail is crimped to the stationary shaft cover, but the bail may be affixed to the stationary shaft cover by suitable fastening means such as an adhesive, welding, and lock by thread-wrapping.

Effects of Invention

In a spinning-reel fishing-line guiding apparatus of the present invention, wire-fabricated bail is insert and fixed into the apex of the roughly round-conical stationary shaft cover, and the bail is joined smoothly into the first ridgeline on the fishing-line guiding side. Thus, snagging areas on the fishing-line guiding side are eliminated. Further, when the fishing line is guided on the fishing-line guiding side from the bail to the stationary shaft cover, the fishing line is not liable to snag in the border area between the bail and the stationary shaft cover. Furthermore, even if the fishing line were to wrap over the side of the bail opposite the fishing-line guiding side, the bail is fitted into the apex of the stationary shaft cover and is joined smoothly to the second ridgeline on the side opposite the fishing-line guiding side. Thus, snagging areas on the side opposite the fishing-line guiding side are eliminated and the fishing line is not liable to snag in the border area. Therefore, even if fishing line gone slack wraps over onto the side opposite the fishing-line guiding side, it is not apt to snarl on the bail arm. Moreover, since the bail is made of wire, it may be made at a finer diameter compared to bails made of pipe. Thus, even fine wet fishing line is not liable get stuck on the bail, nor is the fishing line apt to become snarled by the bail arm.

The terms of degree such as "substantially," "about," and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A spinning-reel fishing-line guiding apparatus pivotably mounted on first and second rotor arms configured to guide fishing line onto a spinning-reel spool, the spinning-reel fishing-line guiding apparatus comprising:
    a first bail-support member mounted pivotally on the first rotor arm;
    a second bail-support member mounted pivotally the second rotor arm;
    a stationary shaft projecting from said first bail-support member;
    a stationary shaft cover being provided on said stationary shaft,
        said stationary shaft cover being configured to extend from said stationary shaft,
        said stationary shaft cover being configured to be spaced at a predetermined interval from said first bail-support member,
        said stationary shaft cover having an approximately round conical shape having an apex,
        said apex being configured to be inclined with respect to an axis of said stationary shaft, and
        said apex being configured to be inclined rearward with respect to a direction in which fishing line is casted and inclined diametrically away from the spool when in a line retrieving posture;
    a line roller rotatably attached to said stationary shaft; and
    a bail being fixed at either end into said second bail-support member and said apex of said stationary shaft cover, said bail being joined smoothly with a first ridgeline on the fishing-line guiding side of said stationary shaft cover and a second ridgeline opposing said first ridgeline in flanking said apex.

2. The spinning-reel fishing-line guiding apparatus according to claim 1, further comprising a mounting hole for mounting said bail, said mounting hole is formed in said apex of said stationary shaft cover on a peripheral surface of said first ridgeline on said stationary shaft cover, a rim of said mounting hole is configured to be skewed to constitute an arcuate portion of an ellipse.

3. The spinning-reel fishing-line guiding apparatus according to claim 2, wherein said rim is inclined at a predetermined angle with respect to a plane intersecting the center axis of said bail as mounted into said stationary shaft cover.

4. The spinning-reel fishing-line guiding apparatus according to claim 3, wherein a length along a major axis of said rim toward said first ridgeline is two times or less said bail in diameter.

5. The spinning-reel fishing-line guiding apparatus according to claim 2, wherein said first bail-support member comprises a resin body section and a plating layer.

6. The spinning-reel fishing-line guiding apparatus according to claim 5, wherein said resin body section comprises a mixture of ABS resin and PC resin.

7. The spinning-reel fishing-line guiding apparatus according to claim 6, wherein said mixture of ABS resin and PC resin ranges from 40:60 to 60:40.

8. The spinning-reel fishing-line guiding apparatus according to claim 7, wherein said mixture of ABS resin and PC resin is 50:50.

9. The spinning-reel fishing-line guiding apparatus according to claim 7, wherein said plating layer comprises palladium.

10. The spinning-reel fishing-line guiding apparatus according to claim 9, wherein said plating layer is formed by a non-eletrolytic plating technique.

11. The spinning-reel fishing-line guiding apparatus according to claim 1, wherein said stationary shaft and said stationary shaft cover are an integrally formed metal manufacture.

12. A spinning reel comprising:
    a reel body having a handle;
    a rotor being rotatably attached to said reel body in a line casting direction, said rotor having a first rotor arm and a second rotor arm extending in said line casting direction along a rotation axis of said rotor;
    a spool being attached to said rotor in said line casting direction; and
    a fishing-line guiding apparatus being pivotally mounted on ends of said first and second rotor arms, said fishing-line guiding apparatus having,
    a first bail-support member mounted pivotally on said first rotor arm,
    a second bail-support member mounted pivotally said second rotor arm,
    a stationary shaft projecting from said first bail-support member,
    a stationary shaft cover being provided on said stationary shaft,
        said stationary shaft cover being configured to extend from said stationary shaft,
        said stationary shaft cover being configured to be spaced at a predetermined interval from said first bail-support member,
        said stationary shaft cover having an approximately round conical shape having an apex,
        said apex being configured to be inclined with respect to an axis of said stationary shaft, and
        said apex being configured to be inclined rearward with respect to a direction in which fishing line is casted and inclined diametrically away from said spool when in a line retrieving posture;

a line roller rotatably attached to said stationary shaft, and a bail being fixed at either end into said second bail-support member and said apex of said stationary shaft cover, said bail being joined smoothly with a first ridgeline on the fishing-line guiding side of said stationary shaft cover and a second ridgeline opposing said first ridgeline in flanking said apex.

13. The spinning-reel fishing-line guiding apparatus according to claim 12, further comprising a mounting hole for mounting said bail, said mounting hole is formed in said apex of said stationary shaft cover on a peripheral surface of said first ridgeline on said stationary shaft cover, a rim of said mounting hole is configured to be skewed to constitute an arcuate portion of an ellipse.

14. The spinning-reel fishing-line guiding apparatus according to claim 13, wherein said rim is inclined at a predetermined angle with respect to a plane intersecting the center axis of said bail as mounted into said stationary shaft cover.

15. The spinning-reel fishing-line guiding apparatus according to claim 14, wherein a length along a major axis of said rim toward said first ridgeline is two times or less said bail in diameter.

16. The spinning-reel fishing-line guiding apparatus according to claim 12, wherein said first bail-support member comprises a resin body section and a plating layer.

17. The spinning-reel fishing-line guiding apparatus according to claim 16, wherein said resin body section comprises a mixture of ABS resin and PC resin.

18. The spinning-reel fishing-line guiding apparatus according to claim 17, wherein said mixture of ABS resin and PC resin ranges from 40:60 to 60:40.

19. The spinning-reel fishing-line guiding apparatus according to claim 18, wherein said mixture of ABS resin and PC resin is 50:50.

20. The spinning-reel fishing-line guiding apparatus according to claim 18, wherein said plating layer comprises palladium.

* * * * *